Dec. 18, 1951     E. A. MORRIS     2,578,940
CURRENT SHUTOFF MECHANISM
Filed May 2, 1950     2 SHEETS—SHEET 1
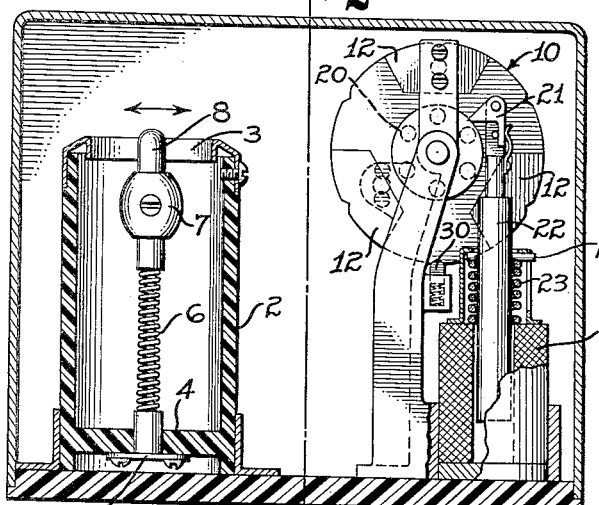
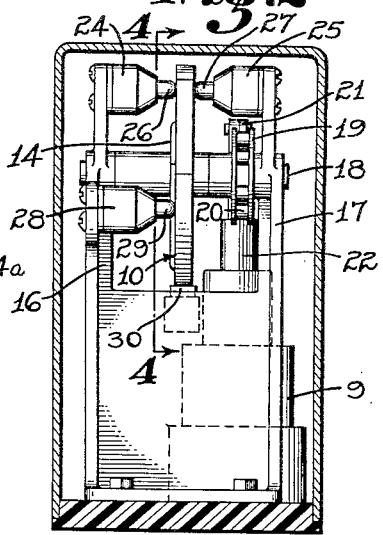
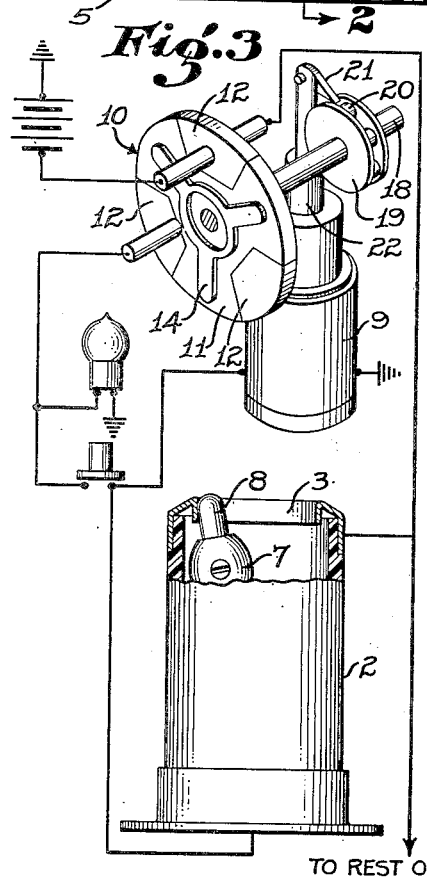
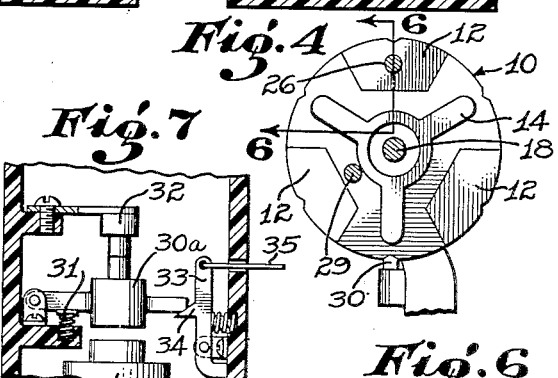
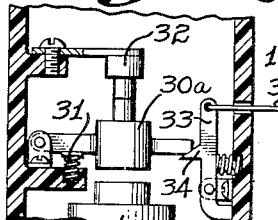
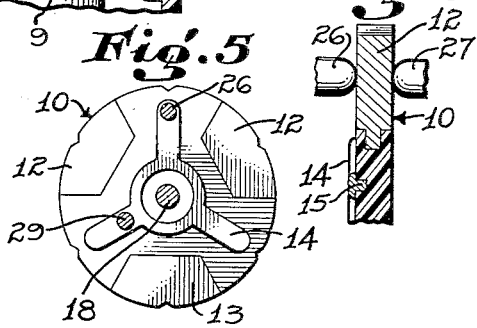
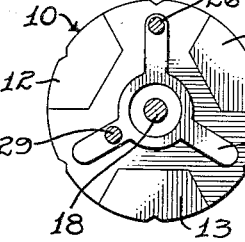
INVENTOR.
Edward A. Morris
BY Lyon & Lyon
ATTORNEY'S Dec. 18, 1951   E. A. MORRIS   2,578,940
CURRENT SHUTOFF MECHANISM
Filed May 2, 1950   2 SHEETS—SHEET 2
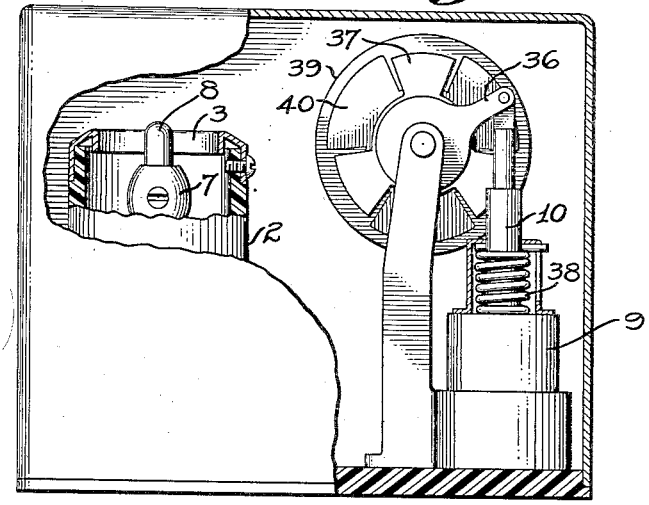
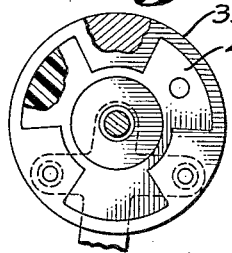
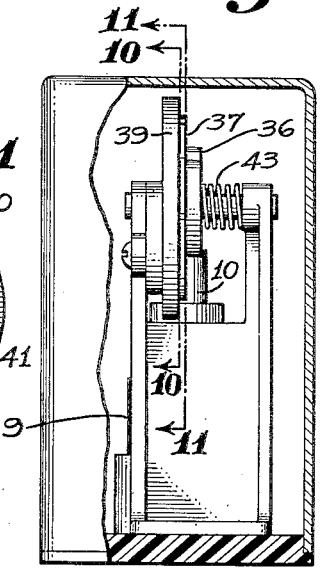
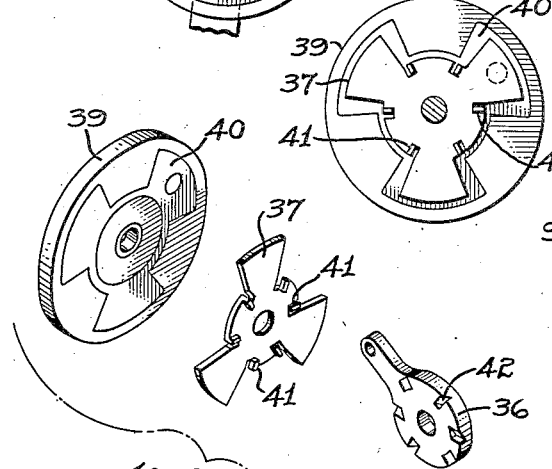
INVENTOR.
Edward A. Morris
BY
Lyon & Lyon
ATTORNEY'S Patented Dec. 18, 1951

2,578,940

UNITED STATES PATENT OFFICE 2,578,940

CURRENT SHUTOFF MECHANISM

Edward A. Morris, Santa Barbara, Calif.

Application May 2, 1950, Serial No. 159,415

2 Claims. (Cl. 200—105)

This invention relates to a mechanism for shutting off circuits in response to shock. The current shutoff mechanism of the present invention is intended for use primarily in connection with automobiles, airplanes, etc., and is designed primarily in the event of an accident for automatically shutting off the current supply to the ignition and other circuits. The most common cause of fire accompanying an accident to an automobile or an airplane arises from electrical circuits, particularly the ignition circuits, and if these can be automatically shut off the danger of fire is greatly reduced.

Difficulty has been experienced in the past in providing a current shutoff mechanism which is sufficiently sensitive so as to insure the shutting off of the ignition circuits in the event of an accident without such shutoff mechanism interfering with the normal operation of the automobile or airplane. Any shutoff mechanism designed to be responsive to shock is going to be operated occasionally by some of the minor shocks incident to normal operation and for practical operation it is, therefore, necessary that there be provided means by which the operator may readily and rapidly restore the ignition circuits and other operation circuits shut off by the current shutoff mechanism.

The principal object of the present invention is to provide a current shutoff mechanism which will be responsive to shock to insure the cutting off of the undesired circuits of the vehicle while at the same time providing such a mechanism as can be readily restored to operating position by the operator from controls which may lead to the normal operating position.

In accordance with the present invention the ignition circuits or other current circuits to be shut off by the current shutoff mechanism of the present invention lead through a switch member which is adapted to be operated by the armature of a magnet to move the switch member to an off position. The switch and armature are so related that there is no possibility of added shock or turning of the vehicle into various positions having the effect of again establishing the circuit.

An important feature of the present invention is that gravity has no tendency for moving the current shutoff switch either to the closed or open position. The switch and operating magnet and armature are also constructed so that a second actuation of the magnet may restore the switch whenever desired to the operating position. The first actuation of the magnet is under the control of a switch member actuated by shock but the circuit from such member to the magnet is opened by a single actuation of the magnet so that no subsequent shock can reactuate the magnet. A separate starting circuit is provided for the magnet which is under the control of a separate manually operated switch capable of restoring the switch member to the closed position.

The current shutoff mechanism of the present invention, together with various further objects and advantages of the invention will be more fully understood from the following description of the preferred examples of the invention. The description is given in connection with the accompanying drawings, in which:

Figure 1 is an elevation mainly in vertical section;

Figure 2 is a section on the line 2—2 of Figure 1;

Figure 3 is a somewhat diagrammatic view of the electrical circuit of the mechanism, the main current control switch and its operating magnet being perspective;

Figure 4 is a fragmentary section on the line 4—4 of Figure 2 with the switch open;

Figure 5 is a somewhat similar view when the switch has been moved from the open to the closed position;

Figure 6 is a section on the line 6—6 of Figure 4;

Figure 7 is a fragmentary elevation partly in section of a modified form of the invention.

Figure 8 is an elevation partly in circular section of a modified form of the invention;

Figure 9 is an elevation at right angles to Figure 8 and partly in section;

Figure 10 is a section on the line 10—10 of Figure 9;

Figure 11 is a section on the line 11—11 of Figure 9;

Figure 12 is an exploded view of certain of the elements of the main current switch.

Referring first to Figures 1 to 6 of the drawings, the present invention includes a form of switch actuated by vibration or shock. As illustrated in the drawings such vibratory switch is shown as including a shell 2 of insulating material, which carries a metallic contact ring 3 at its upper end. The shell is provided with a base 4 to which a contact member 5 is attached, such contact member joining a coiled metal spring 6, which lies axially through the center of the shell 2 and its upper end is connected to a weight 7 and contact member 8. Normally this switch is in the position illustrated in Figure 1 but in event of sufficient vibration or shock on the vehicle equipped with such apparatus the coiled spring 6 allows the contact member 8 to move radially of the shell 2 into position to make contact with the contact ring 3.

This shock actuated switch is in a circuit to the solenoid 9 of a magnet. The circuit to such magnet also includes the main current cutoff switch 10 of the present mechanism. This switch is preferably of a rotary type so as to be substantially uninfluenced by gravity. The major part of the disc 11 is composed of insulating material. There are indicated three segmental inserts 12 of conductive material. These inserts or contact members 12 are placed at three equally circumferentially spaced-apart relations on the disc 11. There are also provided a star-shaped contact member 14, which has three contact arms lying between the contact segments 12. The contact member 14 is held to the insulating disc 11 by suitable means, such as pins 15.

Now referring more particularly to Figure 2, the main current control switch includes frame members 16 and 17, which mount a shaft 18. The shaft 17 supports the disc 11 and also a ratchet wheel 19, which is provided with six equally circumferentially spaced-apart pins 20 for cooperation with a pawl 21. The pawl 21 is pivoted to an armature 22 of the magnet or solenoid 9. A coil spring 23 is provided which yieldingly urges the armature 22 into an upward position. A stop pin 24a is provided for limiting the upward movement of the armature 22. By this construction the pawl 21 normally lies above the ratchet wheel 19 but on each energization of the solenoid 9 the pawl is moved downwardly engaging one of the pins of the ratchet wheel and effecting a rotation of the ratchet wheel, shaft 18 and likewise the disc 11 60° or one-sixth of a revolution. As the solenoid 9 is deenergized the spring 23 returns the pawl to its upper position, the ratchet wheel remaining stationary.

The frame members 16 and 17 also support contact housings 24 and 25, which are provided with contact members 26 and 27 respectively yieldingly urged outwardly against opposite sides of the disc 11, the contact members being axially aligned. There is also a further contact housing 28 supported by the frame member 16 which provides the contact 29 yieldingly urged against the disc 11. This contact member 29 is on the same side of the disc 11 as the contact member 26 and is spaced 120° circumferentially of the contact member 26. The contacts 26 and 27 are positioned radially of the disc 11 so that when the disc rotates into position illustrated in Figure 4 one of the contact segments 12 will lie between contacts 26 and 27 and thereby electrically connect these contacts. When the disc 11 is rotated 60° from the position indicated in Figure 4 (as by a single actuation of the magnet 9) the contacting segment 12 will rotate from between contacts 26 and 27 and contact 26 is brought into contact with one arm of the star-shaped contact 14, another of said arms making contact with the contact 29 as illustrated in Figure 5. There is also preferably provided a spring-pressed detent 30 which is movable into six circumferentially spaced-apart notches on the disc 11, the detent and notches showing that the disc 11 will be stopped after each operation after an exact 60° of rotation. It is to be understood that in practice the switch 10 is included in all of the circuits which are to be interrupted by shock, such as the ignition circuit, lighting circuit, etc., of the automobile or vehicle protected by the apparatus of the present invention.

Now referring to Figure 7 of the drawings, I have shown a modified form of the invention in which a somewhat different form of switch is employed in place of that illustrated in Figure 2. It is to be understood that in connection with the apparatus illustrated in Figure 7 the same shock-actuated contact member 8 is employed as in the previous form of the invention in substantially the same circuit. In this form of the invention in place of the disc current switch there is employed a contact member 30a yieldingly urged by a spring 31 against a second contact member 32. Contacts 30a and 32 are the contacts which, in practice, carry the current leading to the ignition system or to other circuits which are to be interrupted by shock. Contact 30a is in the position illustrated so as to be actuated by the magnet 9. On energizing the magnet 9 contact 30a is drawn downwardly to open the circuit. A spring catch 33 is provided which has an extension 34, which is adapted to lock the contact member 30a in the lower position. An operating rod 35 is provided which leads to the operating position on the dash of the automobile or airplane so that the operator, by pulling said rod, may release contact member 30a to again establish a main ignition circuit, etc., of the automobile or vehicle.

Now referring to Figures 8 to 10 of the drawings, I have illustrated a modified form of the invention which utilizes the same form of vibrating or shock-actuated member 8 and contact ring 3 as in the previous form of the invention. Likewise the same type of magnet 9 and armature 10 is employed. These forms of the invention differ mainly in the construction of the contacts of the main current-interrupting switch of the apparatus. As illustrated the magnet 9 is shown connected to a ratchet wheel 36. Ratchet wheel 36 is for the purpose of rotating a metallic contact member 37 on one actuation of the magnet 9, the ratchet wheel being constructed to return to its original position by means of the spring 38 when the magnet 9 is deenergized. The rotating member 37 makes contact with a stationary disc-shaped contact member 39, which is provided with the star-shaped insulating section 40. Both the rotating member 37 and the insulating section 40 of the stationary contact have a similar number of arms (three as illustrated) so that in one position the contact member 37 may engage only the insulating section 40 of the contact 39 and on each actuation of the member it is adapted to be turned to a position to make contact with the metallic portion of the contact 39 between the arms of the insulated section 40. The contact member 37 is indicated as having a plurality of circumferentially spaced projections 41, which are adapted to be contacted by the edges of slots 42 in the ratchet wheel 36 in order to turn contact member 37 60° on each actuation of magnet 9. A spring 43 is provided yieldingly urging the ratchet wheel 36 against contact member 37, which spring is adapted to permit the return movement of the ratchet wheel 36 without the accompanying movement of the rotary contact 37.

Each of the forms of the current shutoff switch of the present invention are so constructed that they are sensitively responsive to any shock in order to open their main current shutoff contacts and thus protect an automobile, airplane, etc. in event of accident. At the same time each of the current shutoff mechanisms herein described is of a type which allows a control to be provided for again closing the switch so control can readily be placed in the operative position of the vehicle so as to enable the current shutoff mechanism to be restored to operating position in event of some undesirable actuation of the mechanism.

While the particular forms of the invention herein described are well adapted to carry out the objects of the invention, various modifications and changes may be made and this invention is of the scope of the appended claims.

I claim:

1. An electro-magnetic control switch for an emergency cutout ignition system which comprises, a rotating disc, a magnet, ratchet means for effecting partial rotation of said disc in response to successive actuations of said magnet, said disc having alternately circumferentially spaced-apart insulating and conducting segments, a pair of contact members positioned to be electrically connected and electrically insulated by the successive conducting and insulating segments of said disc on alternate actuations of said magnet, a star-shaped contact member on one face of said disc for making contact with one of said pairs of contacts on movement of the insulating segments between said pairs of contacts, and a contact member making continuous contact with said star-shaped contact member.

2. An electro-magnetic control switch for an emergency ignition shutoff system which comprises, a magnet, a disc, ratchet means for effecting successive partial rotation of said disc in response to successive actuation of said magnet, said disc being mainly formed of insulating material with circumferentially spaced-apart inserts of conducting segments, a pair of contacts in position for engaging opposite sides of said conducting segments on alternate actuations of said disc and to be positioned opposite insulating portions of said disc on other alternating actuations, a star-shaped contact member on one face of said disc contacting insulating segments only of said disc and in position to contact one of said contact members on alternate actuations thereof, and a third contact member in continuous contact with said star-shaped contact member.

EDWARD A. MORRIS.

REFERENCES CITED

The following references are of record in the file of this patent:

UNITED STATES PATENTS

| Number | Name | Date |
|---|---|---|
| 154,520 | Robinson | Aug. 25, 1874 |
| 281,799 | Dheehy | July 24, 1883 |
| 355,895 | Sternberg et al. | Jan. 11, 1887 |
| 521,809 | McLaughlin | June 26, 1894 |
| 1,058,986 | Knutson | Apr. 15, 1913 |
| 1,294,928 | McMahon | Feb. 18, 1919 |
| 1,682,599 | Condit | Aug. 28, 1928 |
| 1,890,233 | Phillips | Dec. 6, 1932 |
| 1,987,495 | Soulet | Jan. 8, 1935 |
| 2,048,451 | Johnston | July 21, 1936 |
| 2,192,262 | Griesedieck | Mar. 5, 1940 |